(12) United States Patent
Chung et al.

(10) Patent No.: US 7,848,643 B2
(45) Date of Patent: Dec. 7, 2010

(54) COMMUNICATION RECOVERING SYSTEM FOR WAVELENGTH DIVISION MULTIPLEXED PASSIVE OPTICAL NETWORK

(75) Inventors: Yun Chur Chung, Daejeon (KR); Eui Seung Son, Gyeonggi-do (KR); Kyung Woo Lim, Daegu (KR); Kwan Hee Han, Gyeonggi-do (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 12/458,240

(22) Filed: Jul. 6, 2009

(65) Prior Publication Data

US 2009/0290866 A1 Nov. 26, 2009

Related U.S. Application Data

(62) Division of application No. 11/260,112, filed on Oct. 28, 2005, now Pat. No. 7,558,477.

(30) Foreign Application Priority Data

Nov. 16, 2004 (KR) ...................... 10-2004-0093566

(51) Int. Cl.
*H04J 14/02* (2006.01)
(52) U.S. Cl. ..................... 398/5; 398/7; 398/57; 398/72
(58) Field of Classification Search ...................... 398/2, 398/5, 7, 57, 70–72
See application file for complete search history.

(56) References Cited

U.S. PATENT DOCUMENTS

| H2075 H | 8/2003 | Gnauck et al. |
| 7,340,177 B2 * | 3/2008 | Kwon et al. ................... 398/95 |
| 2005/0008362 A1 | 1/2005 | Jung et al. |
| 2005/0141892 A1 * | 6/2005 | Park et al. ...................... 398/71 |
| 2005/0276603 A1 | 12/2005 | Jung et al. |
| 2006/0165412 A1 * | 7/2006 | Jung et al. ..................... 398/71 |

OTHER PUBLICATIONS

A. J. Phillips et al. "Redundancy Strategies for a High Splitting Optically Amplified Passive Optical Network." *Journal of Lightwave Technology*. vol. 19, No. 2. Feb. 2001, pp. 137-149.

* cited by examiner

*Primary Examiner*—Nathan M Curs
(74) *Attorney, Agent, or Firm*—Oliff & Berridge, PLC

(57) ABSTRACT

A communication recovering system for a wavelength division multiplexed passive optical network (WDM PON) includes a central office and remote nodes. When there is a fault in an optical fiber connecting a first blue/red band coupler to a blue/red band coupler R11, optical signals are inputted/outputted thereto/therefrom through a first 1×2 optical switch and a second blue/red band coupler, and when there is a fault in an optical fiber connecting the second blue/red band coupler to a blue/red band coupler R21, optical signals are inputted/outputted thereto/therefrom through the second 1×2 optical switch and the first blue/red band coupler.

1 Claim, 11 Drawing Sheets

COMMUNICATION RECOVERING SYSTEM FOR WAVELENGTH DIVISION MULTIPLEXED PASSIVE OPTICAL NETWORK

This is a Continuation of application Ser. No. 11/260,112 filed Oct. 28, 2005, which in turn claims the benefit of Korean Patent Application No. 2004-93566, filed Nov. 16, 2004. The entire disclosure of the prior applications is hereby incorporated by reference herein in its entirety.

BACKGROUND OF THE INVENTION

1. Field of the Invention

The present invention relates to a communication recovering system, and more particularly to a communication recovering system for a wavelength division multiplexed passive optical network (WDM PON) which is capable of being implemented with only a single optical fiber using a periodically arrayed waveguide grating (AWG) or protecting/recovering fault of optical fiber by minimizing optical fiber loss, although double optical fibers are used.

2. Description of the Related Art

Recently, as various data services and multimedia services are rapidly increased through the Internet, a large amount of transmission capacity is needed in a subscriber network. In order to comply with such requirement, a wavelength division multiplexed passive optical network (WDM PON) has attracted considerable attention. Here, the WDM PON is capable of providing a wide variety of services as optical signals whose wavelengths are different from each other are provided to each subscriber, and a plurality of optical signals are implemented via wave division multiplexing to be transmitted using a single optical fiber. Such a WDM PON has advantages in that, as outdoor networks are implemented with passive elements to comply with fast transmission of information, networks can be easily installed, maintained and administered, and also extension and security are high. Furthermore, the WDM PON can provide various kinds of services according to wavelengths.

Although such a WDM PON has the above advantages, when substantially implementing the WDM PON, fist of all, economical efficiency therefor must be considered. For that, various light sources, such as, a wavelength-selectivity distributed feedback laser, an injection-locked Fabry-Perot laser, and a spectrum-sliced light emitting diode, etc., have been researched.

Another consideration factor is network reliability when the WDM PON is substantially implemented. Since the WDM PON has a high transmission speed for optical signals compared with prior art subscriber networks, when communication outage occurs due to cutting or errors of optical fibers or optical components, etc., effects thereof are very serious. Generally, when optical components are installed in a sealed container or stable place, occurrence of errors can be reduced, or when the same components are additionally positioned therein, errors can be more effectively prevented. However, since the optical fibers are constructed as outdoor networks, they may be cut at any place and at any time by unexpected causes, such as, road construction, pipe works, and ground collapse, etc. Especially, when a wavelength division multiplexed optical subscriber network suffers structural breakdown, it is impossible to recover the network, thereby weakening reliability of the optical subscriber network.

FIG. 1a is a view illustrating a system for a wavelength division multiplexed passive optical network (WDM PON) of a double star architecture of the prior art.

Referring to FIG. 1a, a central office, CO, is connected to a plurality of remote nodes, RN, through one or more optical fibers. Optical signals are divided into different wavelengths in each remote node including a passive wavelength division demultiplexer, and then are transmitted to each optical network unit, ONU, through optical fibers.

The central office includes transmitters, receivers, wavelength multiplexers and demultiplexers. Optical signals whose wavelengths are different from each other are multiplexed by arrayed waveguide gratings (AWG) and are then transmitted to remote notes via optical fibers. Here, the optical signals are transmitted from a plurality of transmitters. Another AWG in the remote node demulplexes multiplexed signals to send optical signals whose wavelengths are different from each other to each optical network unit. A receiver in the optical network unit transforms the optical signals into electrical signals to perform communication.

Conversely, optical signals transmitted from the transmitters in the optical network units are multiplexed by the same AWG in the remote nodes, and are then transmitted to upstream. Afterwards, the transmitted signals are demultiplexed in the central office and are then received by the receiver.

Accordingly, since a plurality of multiplexed WDM signals are simultaneously transmitted between the central office and the remote nodes, there may be risk that a plurality of optical signals are lost due to optical fiber fault, which is referred to as communication outage. Also, since only a few of specific wavelength optical signals are transmitted between the remote nodes and optical network units, there may be risk that the specific wavelength signals are lost due to optical fiber fault. In order to prevent such optical fiber faults, another optical fiber installed at a detouring optical fiber must be secured. When installing the detouring optical fiber, economical efficiency, efficiency, network recovery time, etc. must be considered, and also the network must be designed such that loss of optical signals is minimized.

FIG. 1b is a view illustrating an optical fiber doubling technology to recover optical fiber fault between a central office and remote nodes in the system of the WDM PON according to FIG. 1a.

Referring to FIG. 1b, a plurality of transmitters Tx and receivers Rx in a central office CO perform communication with transmitters and receivers in each subscriber based on optical signals which are allocated unique wavelengths. The optical fibers having a plurality of wavelengths perform wavelength division multiplexing or demultiplexing via an AWG having a 1×N structure in the central office and the remote nodes. Here, the AWG in the central office is connected to a 1×2 optical switch (1×2 OS), and the AWG in the remote node is connected to a 1×2 star coupler. The 1×2 OS and the 1×2 star coupler are connected to a working fiber and a protection fiber, respectively. Here, the working fiber is operated in a normal state. The protection fiber is operated in a state wherein the working fiber is not operated, and installed therein to form a detouring path. Therefore, the 1×2 OS is connected to the working fiber in a normal state to perform communication between each optical network unit and the central office. When there is a fault at the working fiber, an optical fiber fault monitor, M, detects the fault and rapidly changes the state of the 1×2 OS such that current communication is maintained through the protection fiber. After changing the state of the optical switch, optical signals are recovered through the protection fiber such that communication can be maintained without stoppage. Although such an optical fiber doubling technology requires an additional optical fiber to form a detouring path, it has still attracted considerable attention since any fault generated in the optical fiber can be rapidly recovered. Also, as the remote nodes are implemented with passive elements, costs for maintaining and repairing the networks can be minimized.

However, when the method of FIG. 1b is applied thereto, it has a disadvantage in that performance margin of signals is reduced by more than 3 dB due to optical loss of the star coupler. Also, it has drawbacks in that fault of optical fiber between the remote nodes and the optical network units cannot be recovered. [REFERENCE: A. J. Phillips et al., "Redundancy strategies for a high splitting optically amplified passive optical network," J. Lightwave Technol., February 2001]

On the other hand, although specific methods to implement such an optical fiber doubling technology have been proposed [REFERENCE: A. H. Gnauck, et al., "Reliable architecture for fiber-based broadband local access networks," US Statutory invention registration, US H2075H, Aug. 5, 2003], when a network is entirely connected using optical fibers, since a plurality of protection fibers and AWGs are required, the networks are extremely complicated. Also the networks are not cost-effective. On the other hand, when the number of AWGs is reduced, since usage efficiency for leads of the AWG lead becomes less than 50% and signals are separated using a star coupler, it has disadvantages in that loss of the optical fiber is largely increased. Accordingly, optical fiber protection devices in the WDM PON, which are capable of cost-effectively and efficiently using the networks and minimizing optical fiber loss, are needed.

SUMMARY OF THE INVENTION

Therefore, the present invention has been made in view of the above problems, and it is an object of the present invention to provide a wavelength division multiplexed passive optical network (WDM PON) which is capable of minimizing the number of additional elements and optical fibers needed to enhance economical efficiency and efficiency, minimizing optical loss to maximize margin of optical signals, and detecting fault of optical fibers to rapidly recover the optical fibers.

In accordance with first aspect of the present invention, the above and other objects can be accomplished by the provision of a communication recovering system for a wavelength division multiplexed passive optical network (WDM PON) comprising: a central office, remote nodes, and optical network units.

The central office includes cyclic arrayed waveguide gratings (AWGs) C1 and C2; a first 1×2 optical switch which is installed at multiplexed signal input and output leads of the cyclic AWG C1; a second 1×2 optical switch which is installed at multiplexed signal input and output leads of the cyclic AWG C2; a blue/red (B/R) band coupler C1 which is connected to each of the first and the second 1×2 optical switches; a B/R band coupler C2 which is connected to each of the first and second 1×2 optical switches; a first optical fiber fault monitor which is installed on an optical fiber connecting the first 1×2 optical switch to the B/R band coupler C1, and connected to the first 1×2 optical switch; and a second optical fiber fault monitor which is installed on an optical fiber connecting the second 1×2 optical switch to the B/R band coupler C2, and connected to the second 1×2 optical switch.

The remote nodes include a first remote node RN1 which has a first cyclic AWG R1 whose multiplexed signal input/output lead is connected to the B/R band coupler C1 and whose demultiplexed signal input/output leads are connected to B/R band couplers R1, respectively; and a second remote node RN2 which has a second cyclic AWG R2 whose input/output leads are connected to the B/R band coupler C2 and whose demultiplexed signal input/output leads are connected to B/R band couplers R2, respectively.

The optical network units include a plurality of transmitters/receivers; and star couplers which connect the plurality of transmitters/receivers to the B/R band couplers R1 and R2.

Here, when there is a fault in an optical fiber connecting the B/R band coupler C1 to the cyclic AWG R1 or at an optical fiber connecting the B/R band coupler R1 to the star coupler of the ONU, optical signals are inputted/outputted thereto/therefrom through the first 1×2 optical switch and the B/R band coupler C2, and when there is a fault in an optical fiber connecting the B/R band coupler C2 to the cyclic AWG R2 or at an optical fiber connecting the B/R band coupler R2 to the star coupler of the ONU, optical signals are inputted/outputted thereto/therefrom through the second 1×2 optical switch and the B/R band coupler C1.

In accordance with a second aspect of the present invention, there is provided a communication recovering system for a wavelength division multiplexed passive optical network (WDM PON) comprising: a central office, remote nodes, and optical network units.

The central office includes cyclic arrayed waveguide gratings (AWGs) C1 and C2; a first 1×2 star coupler installed at the multiplexed signal input/output leads of the cyclic AWG C1; a second 1×2 star coupler installed at the multiplexed signal input/output leads of the cyclic AWG C2; a blue/red band coupler C1 connected to each of the first and second star couplers; and a blue/red band coupler C2 connected to each of the first and second star coupler.

The remote nodes include a first remote node RN1 which has a first cyclic AWG R1 whose multiplexed signal input/output lead is connected to the B/R band coupler C1 and whose demultiplexed signal input/output leads are connected to B/R band couplers R1, respectively; and a second remote node RN2 which has a second cyclic AWG R2 whose input/output leads are connected to the B/R band coupler C2 and whose demultiplexed signal input/output leads are connected to B/R band couplers R2, respectively.

The optical network units include a 1×2 optical switch connecting the blue/red band couplers R1 or R2 to transmitter/receiver; and an optical fiber fault monitor which is installed at an optical fiber connecting the 1×2 optical switch to the blue/red band coupler R1 or R2, and connected to the 1×2 optical switch.

Here, when there is a fault in an optical fiber connecting the B/R band coupler C1 to the cyclic AWG R1 or at an optical fiber connecting the B/R band coupler R1 to the 1×2 optical switch, optical signals are inputted/outputted thereto/therefrom through the B/R band couplers C2 and R2 as the B/R band coupler R2 is connected to the 1×2 optical switch, and when there is a fault in an optical fiber connecting the B/R band coupler C2 to the cyclic AWG R2 or at an optical fiber connecting the B/R band coupler R2 to the 1×2 optical switch, optical signals are inputted/outputted thereto/therefrom through the B/R band couplers C1 and R1 as the B/R band coupler is connected to the 1×2 optical switch.

In accordance with a third aspect of the present invention, there is provided a communication recovering system for wavelength division multiplexed passive optical network (WDM PON) comprising: a central office, remote nodes, and optical network units.

The central office includes cyclic arrayed waveguide gratings (AWGs) C1 and C2; a first 1×2 optical switch installed at the multiplexed signal input/output leads of the cyclic AWG C1; a second 1×2 optical switch installed at the multiplexed signal input/output leads of the cyclic AWG C2; a blue/red band coupler C1 connected to each of the first and second optical switches; a blue/red band coupler C2 connected to each of the first and second optical switches; a first optical fiber fault monitor which is installed at an optical fiber connecting the first 1×2 optical switch to the blue/red band coupler C1, and connected to the first 1×2 optical switch; and the second optical fiber fault monitor which is installed at an optical fiber connecting the second 1×2 optical switch to the blue/red band coupler C2, and connected to the second 1×2 optical switch.

The remote nodes include a first remote node and a second remote node, wherein the first remote node includes a blue/red band coupler R11 connected to the B/R band coupler C1; a B/R band coupler R12 connected to a red lead of the B/R band coupler R11; a first 1×2 star coupler connected to each blue lead of the B/R band couplers R11 and R12, and a cyclic AWG R1 whose multiplexed signal input/output leads are connected to the first 1×2 star coupler, and the second remote node includes a B/R band coupler R21 connected to a B/R band coupler C2, a B/R band coupler R22 connected to a blue lead of a B/R coupler R21; a second 1×2 star coupler connected to each of red leads of the B/R band couplers R21 and R22; and a cyclic AWG R2 whose multiplexed signal input/output leads are connected to the second 1×2 star coupler, wherein the B/R band coupler R12 and the B/R band coupler R22 are connected to each other by optical fibers.

Here, when there is a fault in an optical fiber connecting the B/R band coupler C1 to the B/R band coupler R11, optical signals are inputted/outputted thereto/therefrom through the first 1×2 optical switch and the B/R band coupler C2, and when there is a fault in an optical fiber connecting the B/R band coupler C2 to the B/R band coupler R21, optical signals are inputted/outputted thereto/therefrom through the second 1×2 optical switch and the B/R band couplers C1.

In accordance with fourth aspect of the present invention, there is provided a communication recovering system for a wavelength division multiplexed passive optical network (WDM PON) comprising: a central office, remote nodes, and optical network units.

The central office includes a cyclic 2×N AWG C1. The remote nodes include a cyclic 2×N AWG R1 connected to the cyclic 2×N AWG C1. Also, the optical network units is in each of the remote nodes.

Here, multiplexed signal input/output leads of the cyclic 2×N AWG C1 are connected to those of the cyclic 2×N AWG R1 through working optical fibers and protection optical fibers, respectively.

Here, the central office further includes On-Off optical switches connecting the cyclic 2×N AWG C1 to the protection optical fibers, and optical fiber fault monitors connected to the working optical fibers and the On-Off optical switches.

Here, when there is a fault in the working optical fibers, optical signals are inputted/outputted thereto/therefrom through the On-Off optical switch and the protection optical fiber.

In accordance with a fifth aspect of the present invention, there is provided a communication recovering system for a wavelength division multiplexed passive optical network (WDM PON) comprising: a central office, remote nodes, and optical network units.

The central office includes a cyclic 1×N AWG C1. The remote nodes include a cyclic 2×N AWG R1 connected to the cyclic 1×N AWG C1. Also, the optical network units are in each of the remote nodes.

Here, multiplexed signal input/output leads of the cyclic 1×N AWG C1 are connected to those of the cyclic 1×N AWG R1 through working optical fibers and protection optical fibers, respectively.

Here, the central office further includes: a 1×2 optical switch connecting the cyclic 1×N AWG C1 to each of the working optical fibers and the protection optical fibers; an optical fiber fault monitor connected to each of the working optical fibers and the 1×2 optical switch; and an electrical switch array which is installed at front ends of data input/output leads of transmitters and receivers, which are installed at multiplexed signal input/output leads of the cyclic 1×N AWG C1, such that, when a fault occurs in the working optical fibers and then the cyclic 1×N AWG C1 is connected to the protection optical fiber, the electrical switch array can simultaneously change input/output paths of data inputted/outputted to/from the transmitters and receivers to channels therebeside according to monitoring signals of the optical fiber fault monitor.

In accordance with a sixth aspect of the present invention, there is provided a communication recovering system for a wavelength division multiplexed passive optical network (WDM PON) comprising: a central office, remote nodes, and optical network units.

The central office includes at least one arrayed waveguide grating (AWG).

The remote node includes the AWG which is installed corresponding to the AWG of the central office one-to-one; and The optical network units include a transmitter and receiver, which are connected to the AWG of the remote node, wherein the transmitter and receiver of each of the optical network units are connected to the AWG of the remote node through a 2×2 optical switch.

Here, a transceiver connected to the transmitter and the receiver is installed in n-th demultiplexed signal input/output lead of the AWG of the remote node.

Here, an n-x-th 2×2 optical switch installs the AWG of the remote node in the first input/output lead thereof, and installs n-x-th transmitter and receiver in the second input/output leads thereof, which are optically connected to the first input/output lead, in which third and fourth input/output leads of the n-x-th 2×2 optical switch are connected to fourth and third input/output leads of a n-x-1-th and n-x+1-th 2×2 optical switches, respectively, wherein an n-1-th 2×2 optical switch installs the transceiver in the fourth input/output lead thereof.

Here, the AWG of the remote node and the 2×2 optical switches install optical fiber fault monitors therein, which are connected to optical fibers connecting each of the first input/output leads to each of the 2×2 optical switches.

Here, when a fault occurs in any one of the optical fibers, the 2×2 optical switch connected to the optical fiber having such a fault is switched, such that the transmitter and receiver in the optical fiber having the fault can be connected to the transceiver.

BRIEF DESCRIPTION OF THE DRAWINGS

The above and other objects, features and other advantages of the present invention will be more clearly understood from the following detailed description taken in conjunction with the accompanying drawings, in which:

FIG. 1b is a view illustrating an optical fiber doubling technology to recover an optical fiber fault between a central office and remote nodes in the system of the WDM PON according to FIG. 1a;

FIG. 2b is a view describing characteristics of a blue/red band coupler in a communication recovering system in a WDM PON of FIG. 2a;

DESCRIPTION OF THE PREFERRED EMBODIMENTS

Referring to the attached drawings, preferred embodiments of the present invention are described in detail below.

The present invention is related to a system that can automatically recover communication when communication fault occurs due to optical fibers as configurations of a central office and remote nodes and/or optical network units in a wavelength division multiplexed passive optical network (WDM PON), which includes the central office, the remote nodes, and optical network units.

Embodiment 1

Figure 2A:
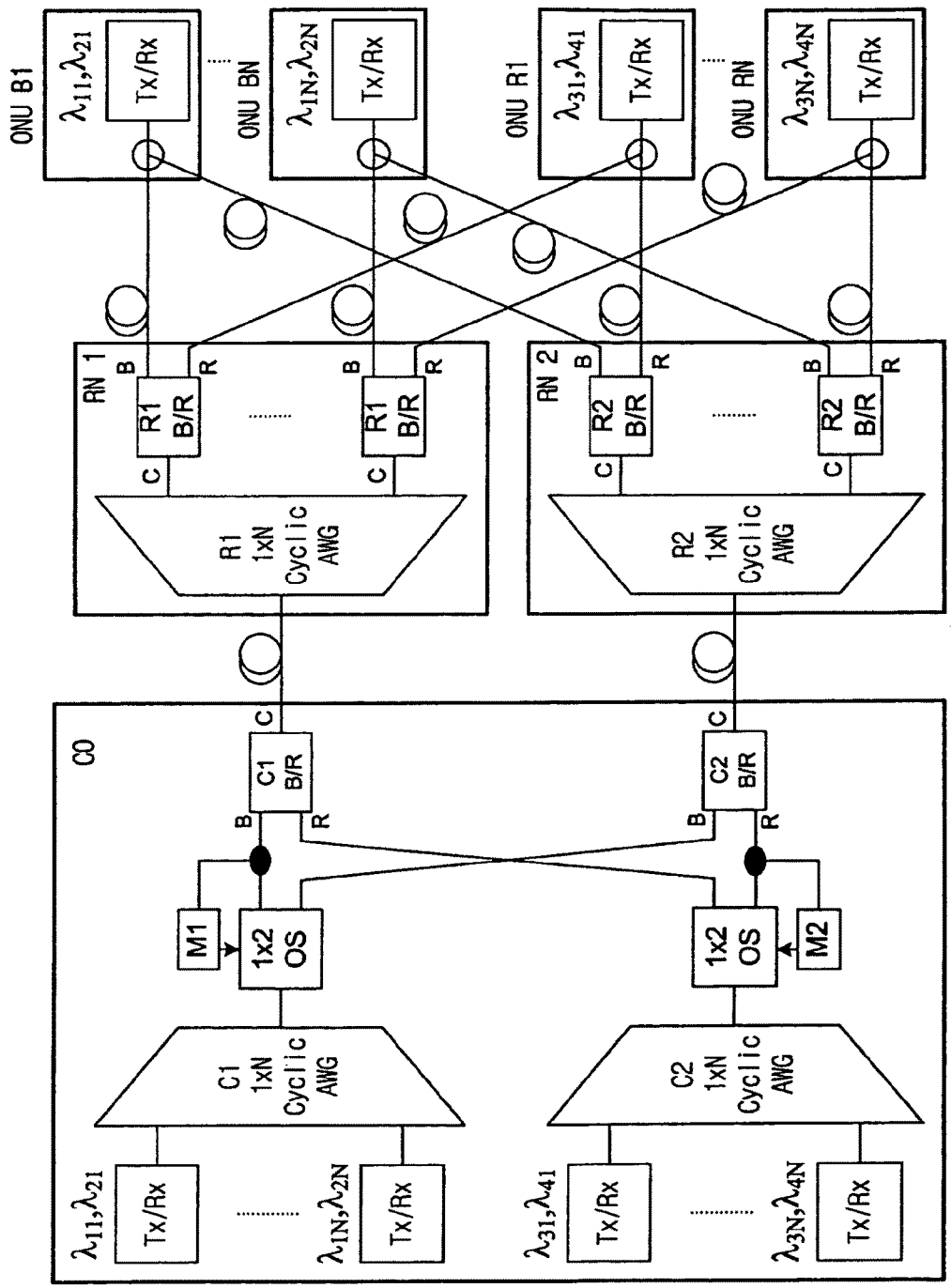
FIG. 2a is a view describing a communication recovering system in a WDM PON according to a first embodiment of the present invention.
Figure 2B:
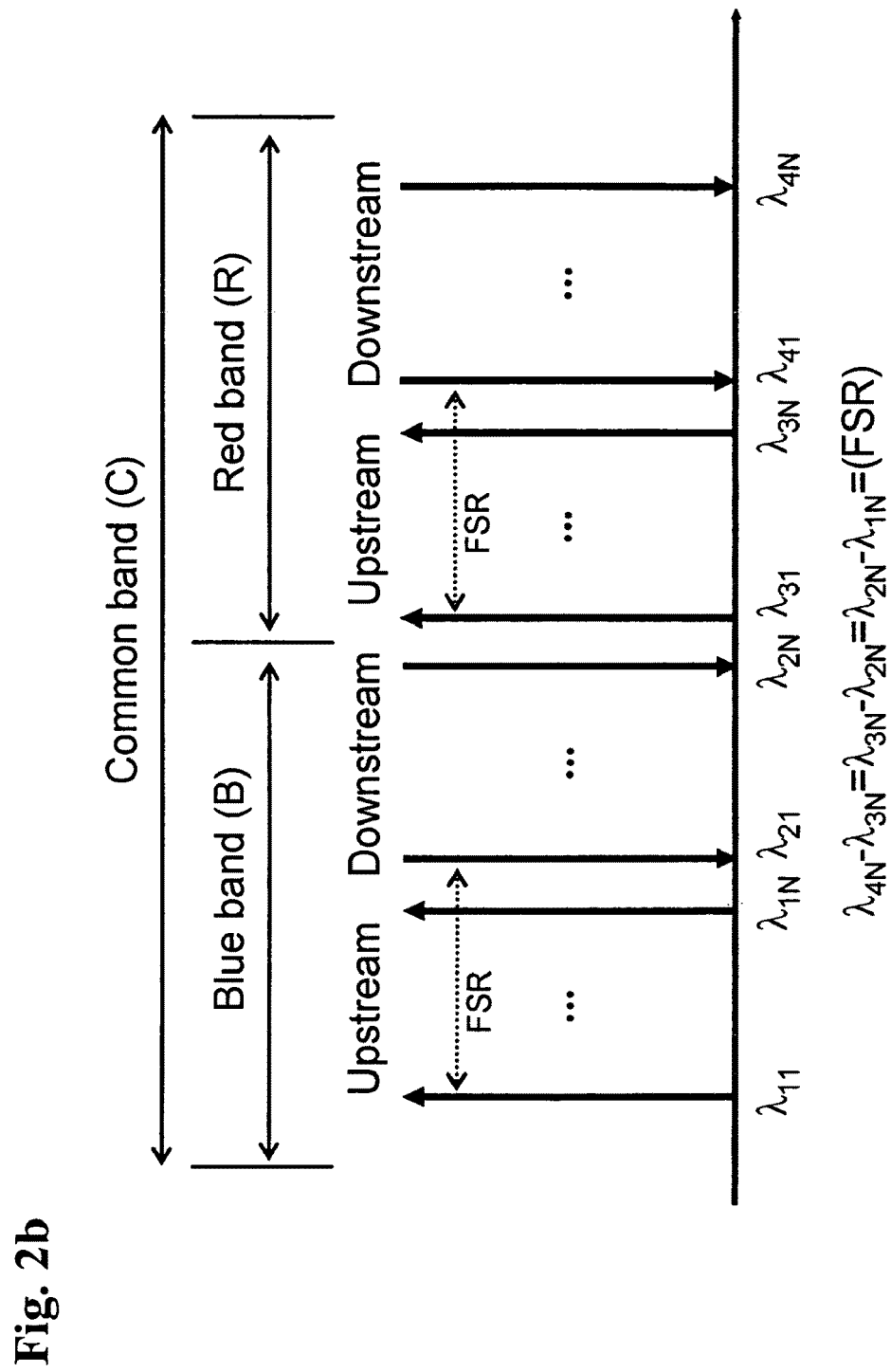

FIG. 2a is a view describing a communication recovering system in a WDM PON according to a first embodiment of the present invention, and FIG. 2b is a view describing characteristics of blue/red band coupler in a communication recovering system in a WDM PON of FIG. 2a.

Referring to FIG. 2a, a central office CO in the communication recovering system includes; a first cyclic AWG (hereinafter, cyclic AWG C1) and a second cyclic AWG (herein after cyclic AWG C2) each of which has a 1×N structure and a cyclic pass characteristic; a first 1×2 optical switch (hereinafter, first 1×2 OS) which is installed at multiplexed signal input and output leads of the cyclic AWG C1 and has a 1×2 structure; a second 1×2 optical switch (hereinafter, second 1×2 OS) which is installed at multiplexed signal input and output leads of the cyclic AWG C2; a first blue/red band coupler (hereinafter, B/R band coupler C1) which is connected to each of the 1×2 optical switches; a second blue/red band coupler, C2 B/R, which is connected to each of the first and second 1×2 OSs; a first optical fiber fault monitor, M1, which is installed on an optical fiber connecting the first 1×2 OS to the B/R band coupler C1, and connected to the first 1×2 OS; and a second optical fiber fault monitor, M2, which is installed on an optical fiber connecting the second 1×2 OS to the B/R band coupler C2, and connected to the second 1×2 OS. Here, the first 1×2 OS connects the cyclic AWG C1 to the B/R band coupler C1 or the B/R band coupler C2 according to signals outputted from the first optical fiber fault monitor M1. Also, the second 1×2 OS connects the cyclic AWG C2 to the B/R band coupler C1 or the B/R band coupler C2 according to signals outputted from the second optical fiber fault monitor M2.

The remote node includes: a first remote node RN1 which has a first cyclic AWG (hereinafter cyclic AWG R1) whose input and output leads are connected to the B/R band coupler C1; and a second remote node RN2 which has a second cyclic AWG (hereinafter cyclic AWG R2) whose input/output leads are connected to the B/R band coupler C2. Here, in the cyclic AWG R1 and cyclic AWG R2, demultiplexed signal input/output leads are connected to a blue/red coupler (hereinafter B/R R1) and to a blue/red coupler (hereinafter B/R R2), respectively.

Through star couplers, each of transmitter/receiver in the ONU is connected to one of among B/R couplers, which are connected to demultiplexed signal input/output leads of the cyclic AWG R1 and to one of among B/R couplers, which are connected to demultiplexed signal input/output leads of the cyclic AWG R2.

With reference to FIG. 2b, the B/R band coupler serves to perform wavelength division multiplexing and demultiplexing for upstream and downstream signals of the first ONU, which performs transmission/reception of optical signals in blue band wavelength, and for upstream and downstream signals of the second ONU, which performs transmission/reception of optical signals in red band wavelength.

For example, assuming a case where there is no fault on an optical fiber of the WDM PON. When the cyclic AWG C1 multiplexes downstream optical signals of blue band wavelength and outputs, the optical signals are inputted to the cyclic AWG R1 via the first 1×2 OS and the first cyclic B/R C1. The cyclic AWG R1 demultiplexes the inputted optical signals based on wavelength. Each demultiplexed signal is transmitted to the ONU in which transmitters/receivers are installed, via a lead of the B/R band coupler passing only blue wavelength therethrough, which is called a blue lead. The upstream optical signal outputted from the ONU is inputted into the cyclic AWG R1 through the B/R band coupler. The optical signals inputted into the cyclic AWG R1 are multiplexed with other optical signals of blue band wavelength, which are outputted from the other ONU. The multiplexed signals are inputted to the cyclic AWG C1 through the B/R C1.

Similarly, downstream optical signals of red band wavelength, which are transmitted via the cyclic AWG C2, the second 1×2 OS and the second cyclic B/R C2, are inputted to the ONU in which transmitters/receivers are installed, via a lead of the B/R band coupler passing only red wavelength therethrough together with the cyclic AWG R2, which is called a red lead. The upstream optical signal outputted from the ONU is inputted into the cyclic AWG R2 through the B/R band coupler, the cyclic AWG R2 and the second B/R C2.

When there is a fault in an optical fiber connecting the B/R band coupler C1 to the cyclic AWG R1 or in an optical fiber connecting the blue leads of the B/R band coupler R1 to the subscriber using blue band wavelength, the first optical fiber fault monitor installed at the central office monitors optical power of the upstream optical signal to detect fault of the optical fiber, and controls the first 1×2 OS such that the downstream optical signals of blue band wavelength which are multiplexed at the cyclic AWG C1 can be transmitted via the first 1×2 OS and the second B/R C2. Therefore, the downstream optical signals of blue band wavelength multiplexed in the cyclic AWG C1 and the downstream optical signals of red band wavelength multiplexed in the cyclic AWG C2 are multiplexed by the second B/R C2, and are then inputted to the cyclic AWG R2 to be demultiplexed. The demultiplexed signals are inputted to the ONU, which uses blue band, through the blue lead of the B/R band coupler and the ONU, which uses red band, through the red lead of the B/R band, respectively. Upstream optical signals outputted from the two ONUs are inputted to the cyclic AWG R2 through the 1×2 star coupler located at the ONU and the B/R band coupler located at the remote node R2. The optical signals inputted to the cyclic AWG R2 are multiplexed together with the optical signals of blue/red band wavelengths, which are outputted from the other ONUs, and are then outputted to the B/R C2. Namely, the optical signals of blue band wavelength from the cyclic AWG R2 are inputted to the cyclic AWG C2 through the B/R C2, and the optical signals of red band wavelength are inputted to the cyclic AWG C2.

When there is a fault in the optical fiber connecting the B/R C2 to the cyclic AWG R2 or at the optical fiber connecting the red leads of the first B/R R2 to the subscriber using red band wavelength, the second optical fiber fault monitor installed at the central office monitors and controls the second 1×2 OS such that downstream optical signals of red band wavelength, which are multiplexed in the cyclic AWG C2, are transmitted thereto through the second 1×2 OS and the B/R C1. Therefore, sine the situation wherein the fault occurs at the optical fiber connecting the B/R C1 to the cyclic AWG R1 is similar to that of the fault where the fault occurs at the optical fiber connection the blue lead of the B/R R1 to the subscribers using blue band wavelength except that the optical signals are transmitted/received therefrom/thereto through the B/R C1 and the cyclic AWG R1, the above mentioned procedures after faults are identically proceeded.

In the first embodiment of the present invention, the upstream optical signals in blue wavelength band and the upstream optical signals in red wavelength band are worked by a distance of Free Spectral Range (FSR) as the period of the cyclic AWG having a cyclic passing characteristic, and the optical signals in red wavelength band and blue wavelength band are divided or coupled, according to the B/R band coupler, and are then transmitted thereto. Therefore, the optical signals are prevented from interfering with each other. Also, the ONUs use only wavelengths in the blue band or only wavelengths in the red band, such that optical signals cannot interfere with one another.

Embodiment 2

Figure 2C:
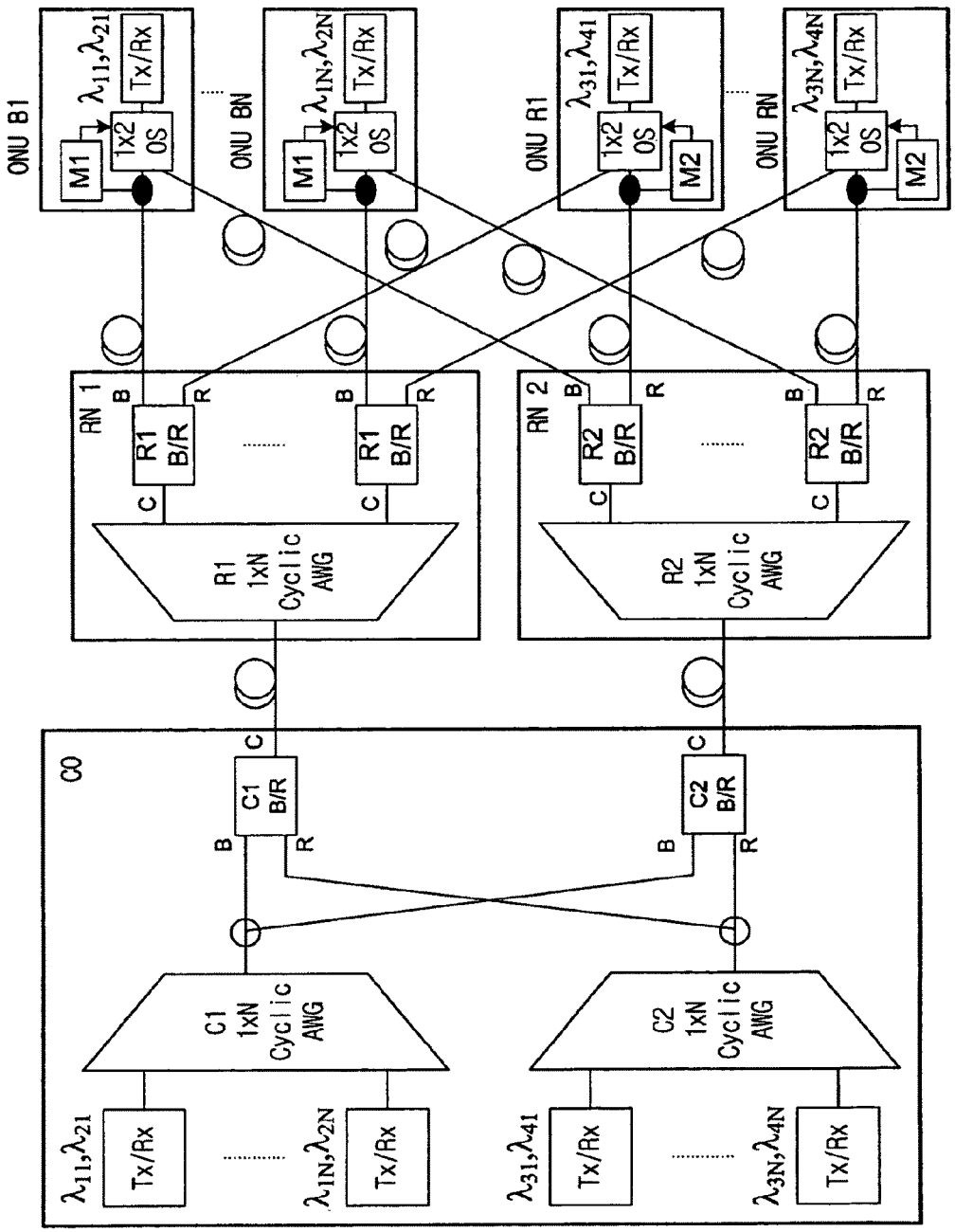
FIG. 2c is a view illustrating a modification of the communication recovering system in a WDM PON according to the first embodiment of the present invention.

FIG. 2c is a view illustrating a modification of the communication recovering system in a WDM PON according to the first embodiment of the present invention.

Figure 1A:
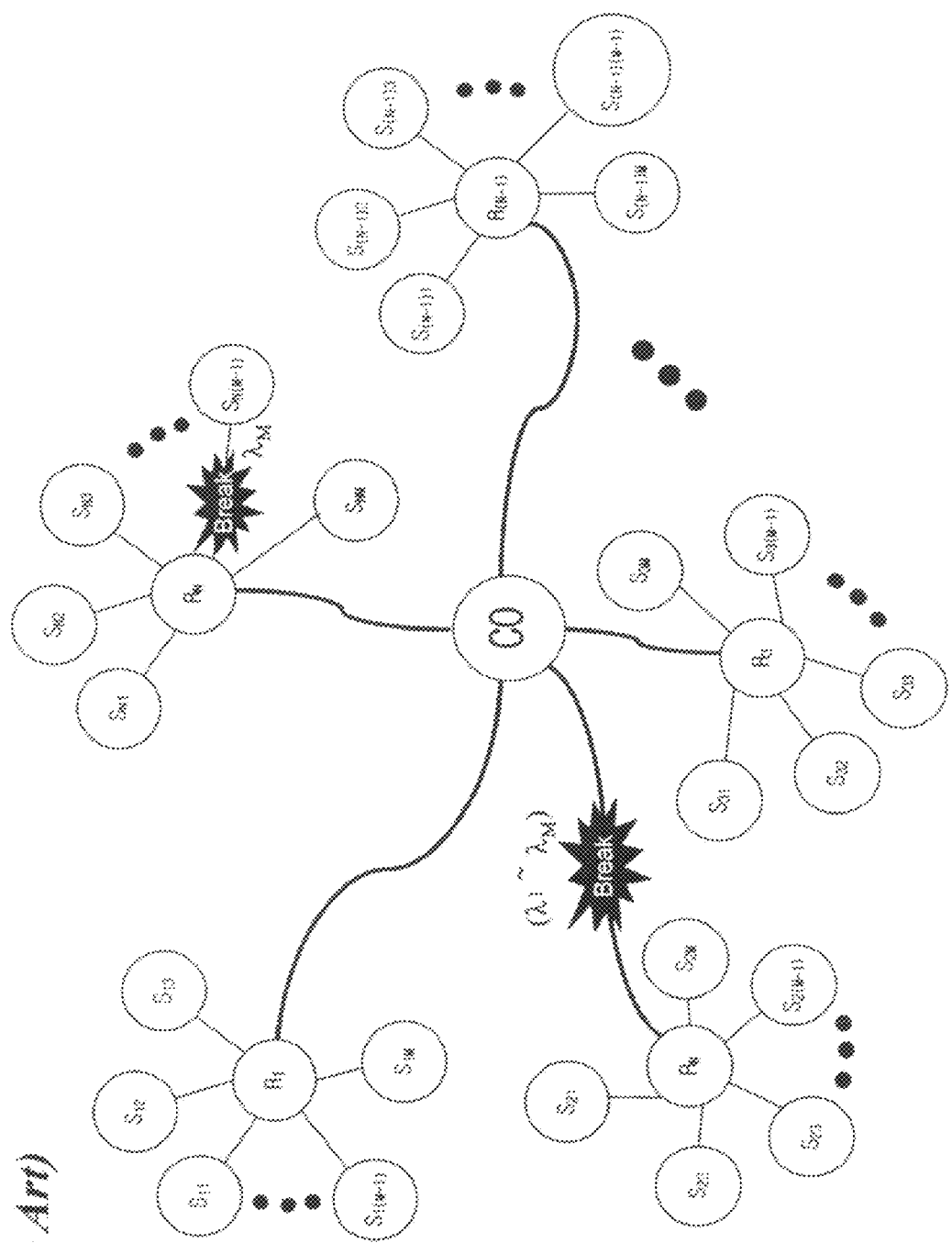
FIG. 1a is a view illustrating a system for a wavelength division multiplexed passive optical network (WDM PON) of a double star architecture of the prior art.
Figure 1B:
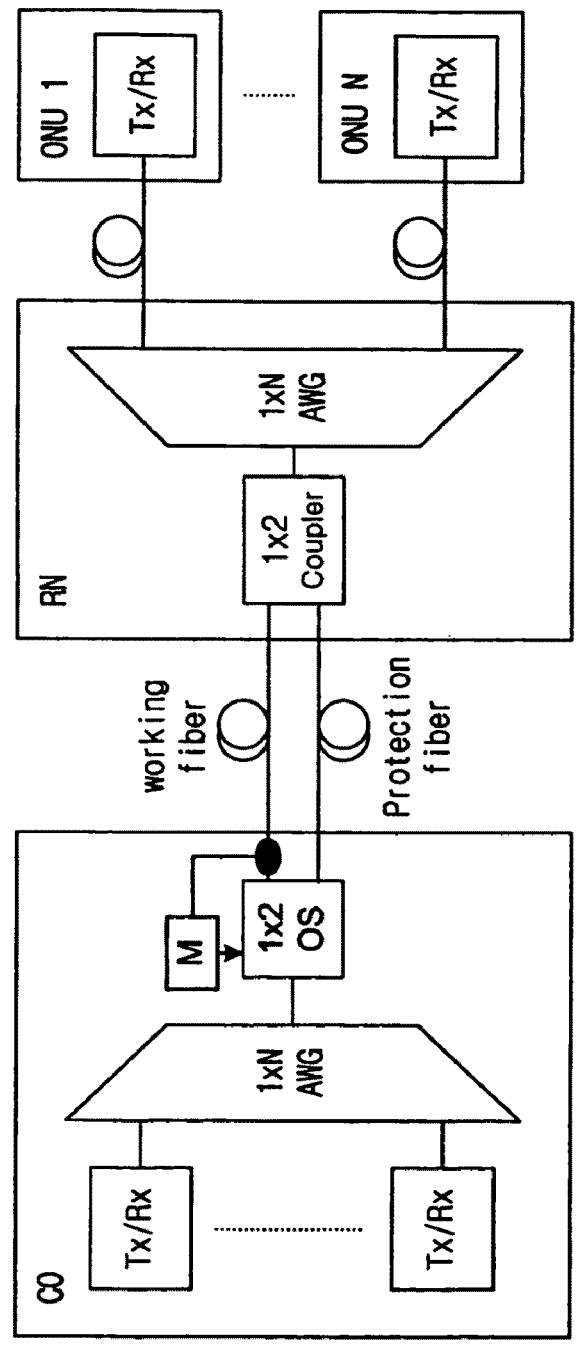

Referring to FIG. 2c associated with FIG. 2a, 1×2 star couplers are installed in the central office CO according to the present invention, instead of the 1×2 optical switches as shown in FIG. 2a, but the optical fiber fault monitors are not installed therein, which is different from FIG. 2a. On the other hand, the ONUs according to the present invention install an 1×2 optical switch, instead of the star couplers as shown in FIG. 2a. Also, the ONUs install optical fibers connecting the 1×2 optical switch to the B/R band coupler R1 or the B/R band coupler, and an optical fiber fault monitor to be connected to the 1×2 optical switch.

Therefore, when there is a fault in the optical fiber connecting the B/R C1 band coupler to the cyclic AWG R1, or in the optical fiber connecting the B/R band coupler R1 to the 1×2 optical switch, the B/R R2 band coupler and the 1×2 optical switch are connected to each other, such that optical signals can be inputted or outputted thereto/therefrom, through the B/R C2 band coupler and the B/R R2 band coupler.

Also, when there is any fault in the optical fiber connecting the B/R C2 band coupler to the cyclic AWG R2, or in the optical fiber connecting the B/R band coupler R2 to the 1×2 optical switch, the B/R R1 band coupler and the 1×2 optical switch are connected to each other, such that optical signals can be inputted or outputted therein/thereto, through the B/R C1 band coupler and the B/R R1 band coupler.

Embodiment 3

Figure 2D:
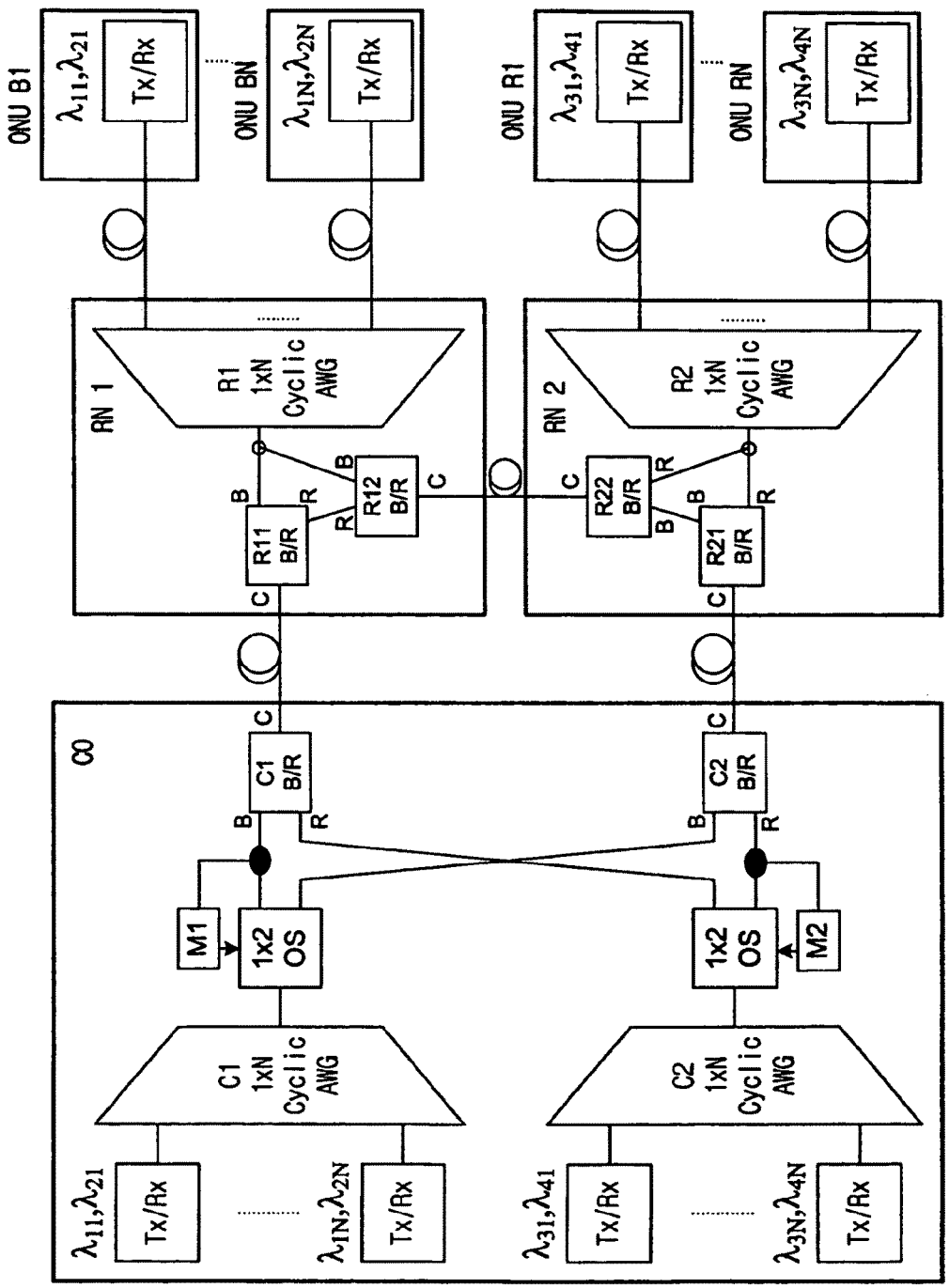
FIG. 2d is a view illustrating another modification of the communication recovering system in a WDM PON according to the first embodiment of the present invention.

FIG. 2d is a view illustrating another modification of the communication recovering system in a WDM PON according to the first embodiment of the present invention.

Referring to FIG. 2d associated with FIG. 2a, the first remote node RN1 includes: a B/R band coupler R11 connected to a B/R band coupler C1; a B/R band coupler R12 connected to a lead of a B/R coupler R11; a first 1×2 star coupler connected to each blue lead of the B/R band couplers R11 and R12; and a cyclic AWG R1 whose multiplexed signal input/output leads are connected to the first 1×2 star coupler. The second remote node RN2 includes: a B/R band coupler R21 connected to a B/R band coupler C2; a B/R band coupler R22 connected to a blue lead of a B/R coupler R21; a second 1×2 star coupler connected to each of red leads of the B/R band couplers R21 and R22; and a cyclic AWG R2 whose multiplexed signal input/output leads are connected to the second 1×2 star coupler. Here, the B/R band coupler R12 and the B/R band coupler R22 are connected to each other by optical fibers.

Each transmitter/receiver of the ONU is directly connected to the demultiplexed signal input/output leads of the cyclic AWG R1 or the cyclic AWG R2.

Accordingly, in case that there is no fault in the optical fiber of the WDM PON, when the cyclic AWG C1 multiplexes downstream optical signals of blue band wavelength and then outputs them, the optical signals pass through the B/R band coupler and the first 1×2 star coupler via the first 1×2 optical switch and the B/R band coupler C1 to be inputted into the cyclic AWG R1. Then, the cyclic AWG R1 demultiplexes the inputted signals based on wavelengths such that each demultiplexed signal can be inputted to the ONU. Upstream optical signals outputted from the ONU are inputted into cyclic AWG R1. The optical signals inputted into the cyclic AWG R1 are multiplexed with optical signals having blue band wavelength which are outputted from other ONUs, and are then outputted. The outputted signals pass through the first 1×2 star coupler and the B/R band coupler R11. After that, the signals are inputted into cyclic AWG C1 through the B/R band coupler C1. Similarly, the downstream optical signals of red band wavelength, transmitted through the cyclic AWG C2, the second 1×2 optical switch and the B/R band coupler C2, pass through the B/R band coupler R21 and the second 1×2 star coupler, and are then inputted to an ONU via the cyclic AWG R2. Upstream optical signals outputted from the ONU are inputted to the cyclic AWG C2 through the cyclic AWG R2, the second 1×2 star coupler and B/R band coupler R21, and the B/R band coupler C2.

On the other hand, when there is a fault in the optical fiber connecting a B/R band coupler C1 with the B/R band coupler R11, the first optical fiber fault monitor installed in the central office monitors optical power of upstream optical signals to detect whether there is any fault in the optical fiber, and controls the first 1×2 optical switch such that the downstream optical signals of blue band wavelength, which are multiplexed in the cyclic AWG C1, are transmitted through the first 1×2 optical switch and the B/R band coupler C2. Therefore, the downstream optical signals of blue band wavelength, which are multiplexed in the cyclic AWG C1, and the downstream optical signals of red band wavelength, which are multiplexed in the cyclic AWG C2, are multiplexed in the B/R band coupler C2, and are then inputted to the B/R band coupler R21. After that, the optical signals inputted to the B/R band coupler are demultiplexed into blue band wavelength signals and red band wavelength signals, respectively. The blue band wavelength signals are inputted to the cyclic AWG R1 through the B/R band couplers R22 and R12 and the first 1×2 star coupler to be demultiplexed therein. After that, the demultiplexed signals are inputted to ONUs, respectively. The upstream optical signals outputted from each ONU are inputted to the cyclic AWG R1 to be multiplexed, and are then inputted to the B/R band coupler through the first 1×2 star coupler and the B/R band coupler R12 and R22. After that, the upstream optical signals are multiplexed with red and blue wavelength signals in the B/R band coupler R12 to be outputted therefrom. Of the outputted optical signals from the B/R band coupler R12, optical signals of blue band wavelength are inputted to the cyclic AWG C1 through the B/R band coupler C2, and the optical signals of red band wavelength are inputted to the cyclic AWG C2.

Also, in case that there is a fault in the optical fiber connecting a B/R band coupler C2 with B/R band coupler R21, the second optical fiber fault monitor installed in the central office monitors such fault, and controls the second 1×2 optical switch such that downstream optical signals of red band wavelength, multiplexed in the cyclic AWG C2, can be transmitted through the second 1×2 optical switch and B/R band coupler C1. Therefore, the situation, where there is a fault in the optical fiber connecting a B/R band coupler C2 with B/R band coupler R21, is the same as when there is a fault in the optical fiber connecting a B/R band coupler C1 with B/R band coupler R11, except that the optical signals are transmitted/received through the B/R band coupler C1 and the B/R band coupler R11.

When communication is interrupted as a fault occurs in any optical fiber, unlike the prior art technology where protection optical fibers are added to all of the optical fibers, since the first and second embodiments of the present invention, as mentioned above, add the protection optical fibers only to an optical fiber connecting the remote node to the ONU, communication can be continuously performed through a working optical fiber as a communication path is changed by the 1×2 optical switch. Therefore, such a fault can be rapidly recovered. Also, in the case that communication is interrupted as a fault occurs in an optical fiber connecting the central office and the remote node, unlike the prior art technology where protection optical fibers are added thereto, since the third embodiment of the present invention connects two remote nodes using a single optical fiber, communication can be continuously performed through a working optical fiber as a communication path is changed by the 1×2 optical switch. Therefore, such a fault can be rapidly recovered. Consequently, compared with the prior art technology where double the number of optical fibers is used, the present invention can reduce maintenance costs, and rapidly recover communication faults because communication protection time depends on processing time of an optical fiber fault monitor and switching time of a 1×2 optical switch.

Embodiment 4

Figure 3A:
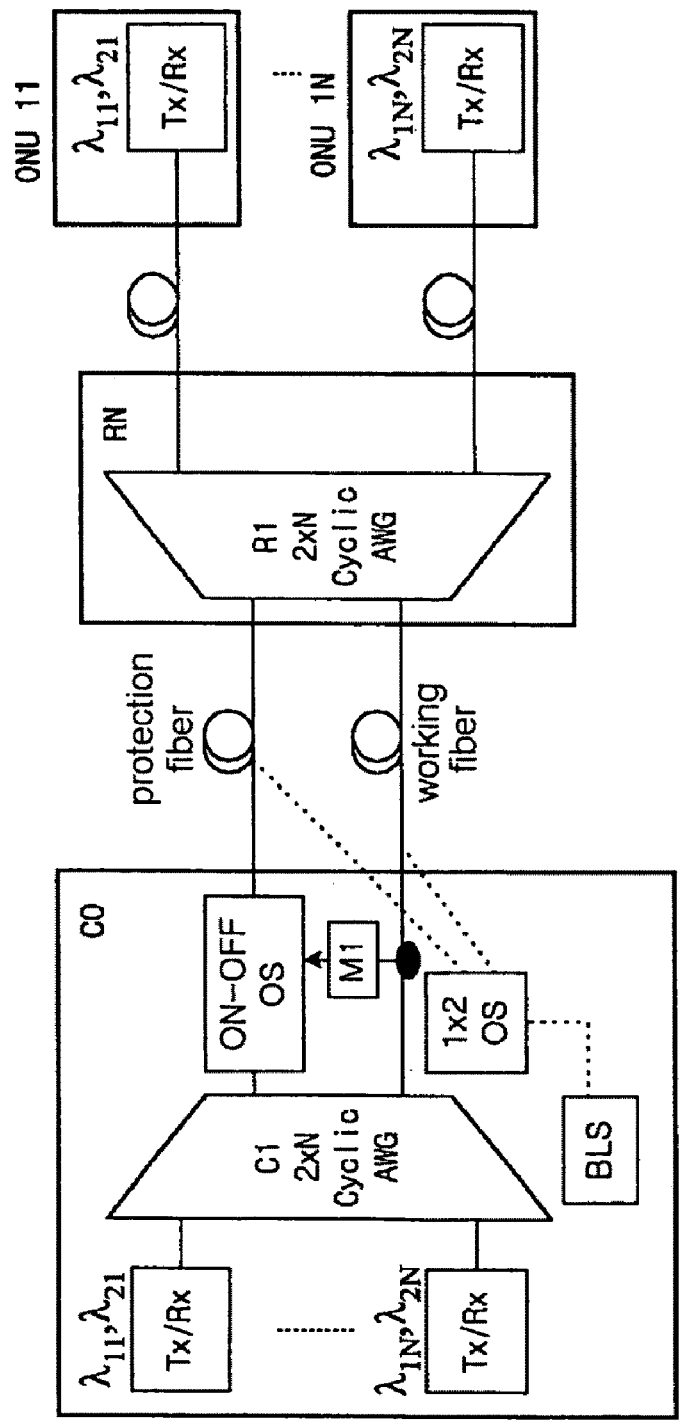
FIG. 3a to FIG. 3c are views describing a communication recovering system in a WDM PON according to a fourth embodiment of the present invention.
Figure 3B:
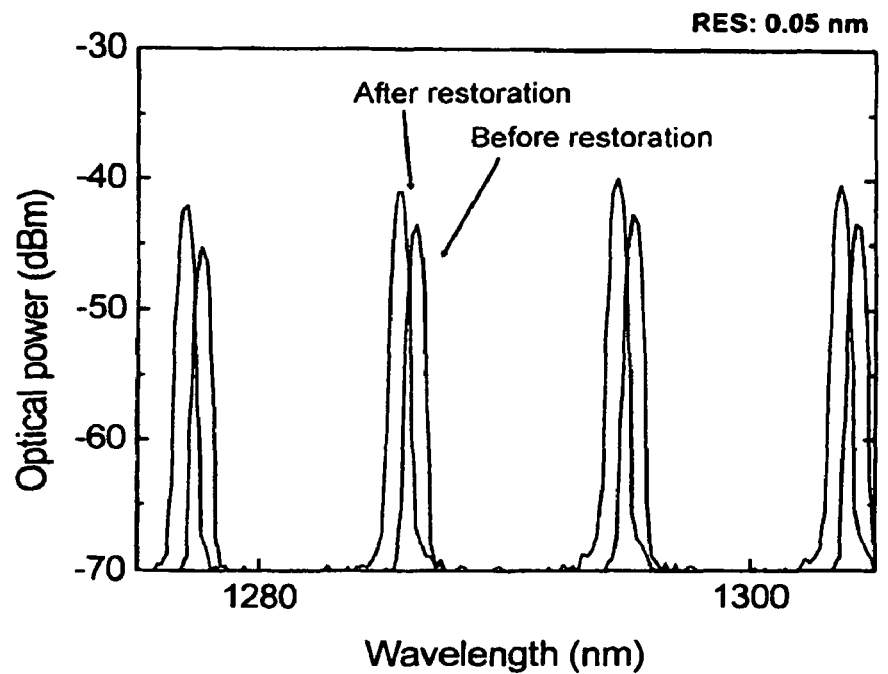
Figure 3C:
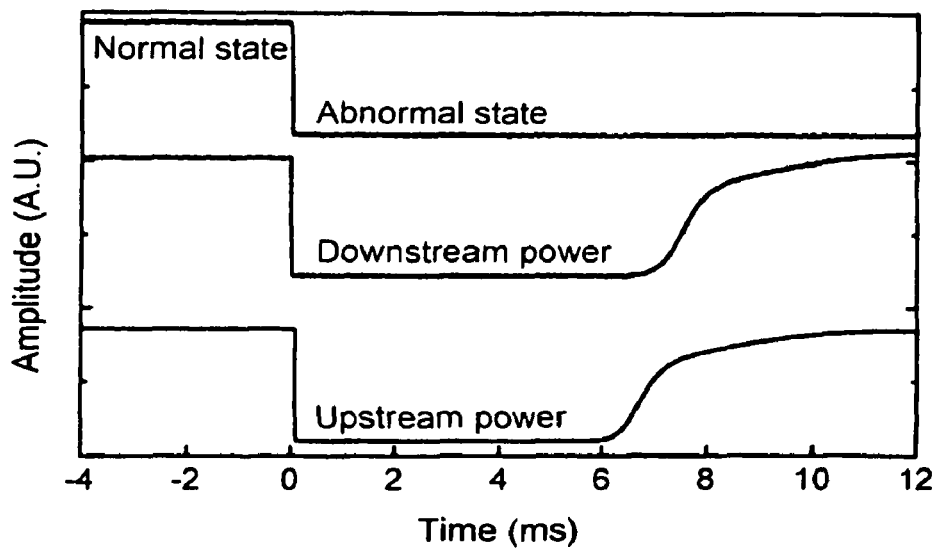

FIG. 3a to FIG. 3c are views describing a communication recovering system in a WDM PON according to a fourth embodiment of the present invention.

Referring to FIG. 3a, in the communication recovering system in a WDM PON according to the present invention, a central office CO includes a cyclic AWG, which is configured as a structure of 2×N and has a cyclic pass characteristic, which is called hereinafter a Cyclic AWG C1, and a remote node RN includes a cyclic 2×N AWG R1 which is connected to the cyclic 2×N AWG C1. Here, multiplexed signal input/output leads of the cyclic 2×N AWG C1 are connected to those of the cyclic 2×N AWG R1 through working optical fibers and protection optical fibers, respectively. An optical fiber fault monitor M1 and an On-Off optical switch are installed in the central office, such that the central office and the remote node can be connected to each other via the protection optical fiber when a fault occurs in the working optical fiber based on monitoring of the working optical fiber. Namely, the central office installs an On-Off optical switch and optical fiber fault monitor therein, in which the On-Off optical switch connects the cyclic 2×N AWG C1 to the protection optical fiber, and the optical fiber fault monitor M is connected to the working optical fiber to the cyclic 2×N AWG C1, respectively.

Therefore, when there is a fault in the working optical fiber, the cyclic 2×N AWG C1 is connected to the cyclic 2×N AWG R1 through the On-Off optical switch and the protection optical fiber, such that multiplexed optical signals can be transmitted/received thereto/therefrom.

Namely, in a normal state, the On-Off optical switch is maintained in an Off-state, thereby performing upstream/downstream optical communication. Here, since the cyclic 2×N AWG periodically has a pass band at every FSR, when each ONU uses a working optical fiber and a protection optical fiber, it can perform communication using different wavelengths. For example, in case that optical network units ONU11 and ONU21 perform upstream/downstream transmission using wavelengths, $\lambda 11$ and $\lambda 21$, respectively, $\lambda 11$ and $\lambda 21$ are the wavelengths that the optical network units ONU11 and ONU21 can be communicated to each other via protection optical fiber due to transmission characteristic having a 2×N structure. Therefore, in order to completely recover communication, wavelength of a light source in the transmitter must be simultaneously transformed. For this, the fourth embodiment of the present invention employs a light source for WDM PON, such as a light source employing spectrum slicing or injection locking, which does not have wavelength selectivity. Here, when the WDM PON employs a spectrum sliced light source, since the light source uses a wide wavelength band and automatically allocates its wavelengths by the AWG, it can be directly used in the fourth embodiment of the present invention. On the other hand, when the WDM PON employs a Fabry-Perot light source in an injection locking manner, a Broadband Light Source (BLS) is added thereto. Also, a 1×2 optical switch is additionally installed thereto so that the BLS is connected to the working optical fiber or the protection optical fiber.

FIG. 3b shows graphs based on experimental results to show whether wavelength is transformed before and after a fault occurs in the WDM PON according to the present invention which uses a light source in a spectrum sliced manner.

Referring to FIG. 3b, since wavelength is shifted by 100 GHz regarding all the channels by change of pass characteristics of the cyclic AWG, there is no inter-channel interference.

FIG. 3c is a timing chart when the WDM PON of the fourth embodiment of the present invention uses a mechanical optical switch as the On-Off optical switch.

Referring to FIG. 3c, when a fault occurs in an optical fiber, both optical powers of upstream and downstream signals are reduced, thereby interrupting communication. Here, as the optical fiber fault monitor monitors such a phenomenon and changes a state of the optical switch, all of the signals are rapidly recovered within 8 msec such that their optical powers can be increased. Here, protection time depends on switching operation of the optical switch. Namely, the faster the optical switch is operated, the shorter the protection time.

Embodiment 5

Figure 3D:
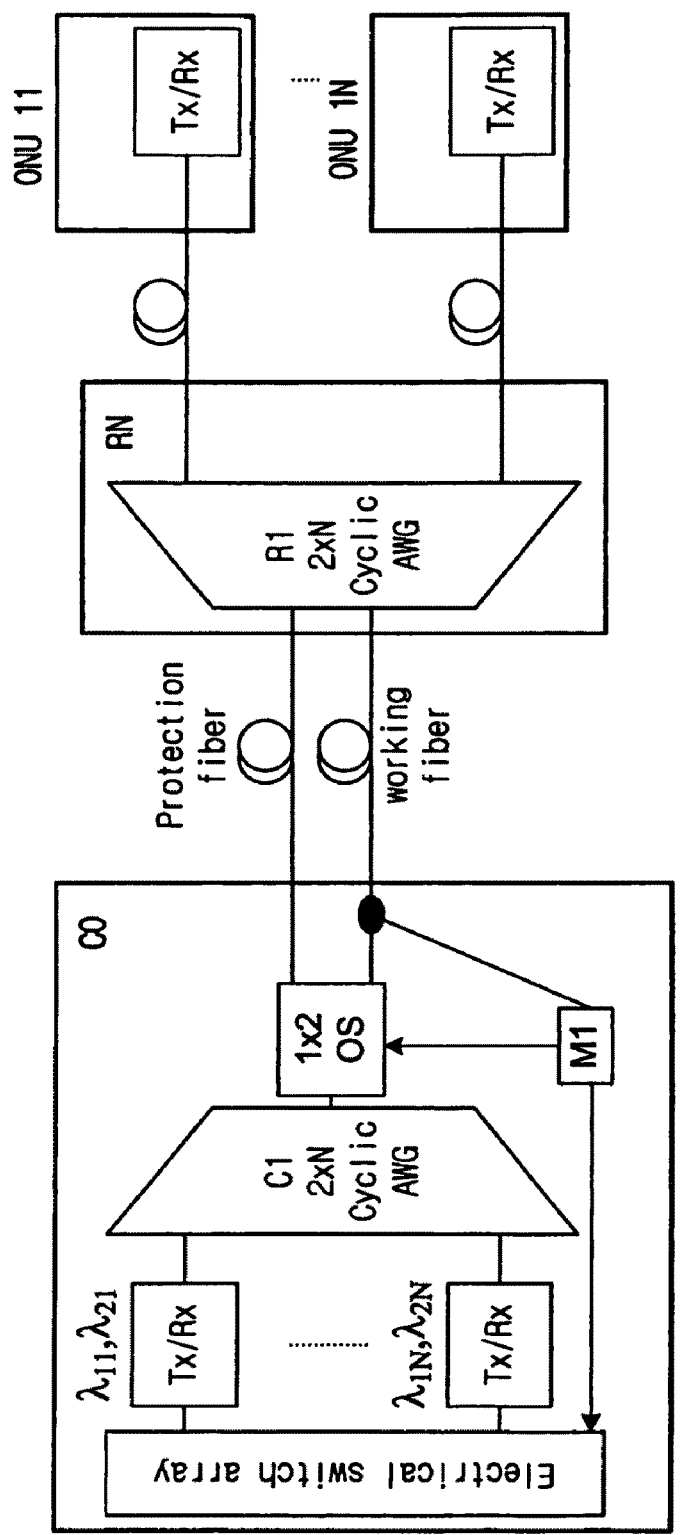
FIG. 3d is a view illustrating a modification of the communication recovering system in a WDM PON according to the fourth embodiment of the present invention.

FIG. 3d is a view illustrating a modification of the communication recovering system in a WDM PON according to the fourth embodiment of the present invention.

Referring to FIG. 3d, in the communication recovering system in a WDM PON according to the present invention, a central office CO includes a cyclic AWG, which is configured as a structure of 1×N and has a cyclic pass characteristic, which is called hereinafter a Cyclic AWG C1, and a remote node RN includes a cyclic 2×N AWG R1 which is connected to the cyclic 1×N AWG C1. Here, multiplexed signal input/output leads of the cyclic 1×N AWG C1 are connected to those of the cyclic 2×N AWG R1 through working optical fibers and protection optical fibers, respectively. An optical fiber fault monitor M1 and a 1×2 optical switch are installed in the central office, such that the central office and the remote node can be connected to each other via the protection optical fiber when a fault occurs in the working optical fiber based on monitoring of the working optical fiber. Namely, a 1×2 optical switch and optical fiber fault monitor are installed in the central office installs, in which the 1×2 optical switch connects the cyclic 1×N AWG C1 to the protection optical fiber, and the optical fiber fault monitor M1 is connected to the working optical fiber and the 1×2 optical switch, respectively.

Therefore, when there is a fault in the working optical fiber, the cyclic 1×N AWG C1 is connected to the cyclic 2×N AWG R1 through the 1×2 optical switch and the protection optical fiber, such that multiplexed optical signals can be transmitted/received thereto/therefrom. Here, an electrical switch array is installed at front ends of data input/output leads of the transmitters and receives, which are installed at multiplexed signal input/output leads of the cyclic 1×N AWG C1, such that the electrical switch array can be connected to the transmitters, receivers and optical fibers, respectively. When a fault occurs in the working optical fiber and thereby the cyclic 1×N AWG C1 is connected to the protection optical fiber, the electrical switch array simultaneously changes input/output paths of data inputted/outputted to/from the transmitters and receivers to channels therebeside according to monitoring signals of the optical fiber fault monitor.

The 2×N AWG of the remote node periodically shows pass bands at every FSR, since wavelengths of multiplexed signals of the central office are not changed, the ONU performs communication at different wavelengths based on determination as to whether the central office and the remote node are connected to each other via the working optical fiber or the protection optical fiber. For example, under normal conditions, the optical network units ONU11 and ONU21 perform upstream/downstream transmission using wavelengths $\lambda 11$ and $\lambda 21$, respectively, $\lambda 11$ and $\lambda 21$ are the wavelengths at which the optical network units ONU11 and ONU21 can communicate with each other via the protection optical fiber due to transmission characteristic having a 2×N structure.

Since the fourth and fifth embodiments of the present invention do not employ star couplers, optical loss is relatively small. Also, since network protection time depends on processing time of the optical fiber monitor and switching time of an On-Off optical switch and 1×2 optical switch, the network is relatively rapidly recovered.

In addition, unlike the fourth embodiment of the present invention, the fifth embodiment of the present invention can relatively rapidly recover communication stoppage of each ONU, which is caused by a fault of the optical fiber, although wavelength of a light source of the central office is fixed. Therefore, communication can be recovered within a range of least optical loss in a network where fast communication over 1.2 Gb/s is performed.

Embodiment 6

Figure 4A:
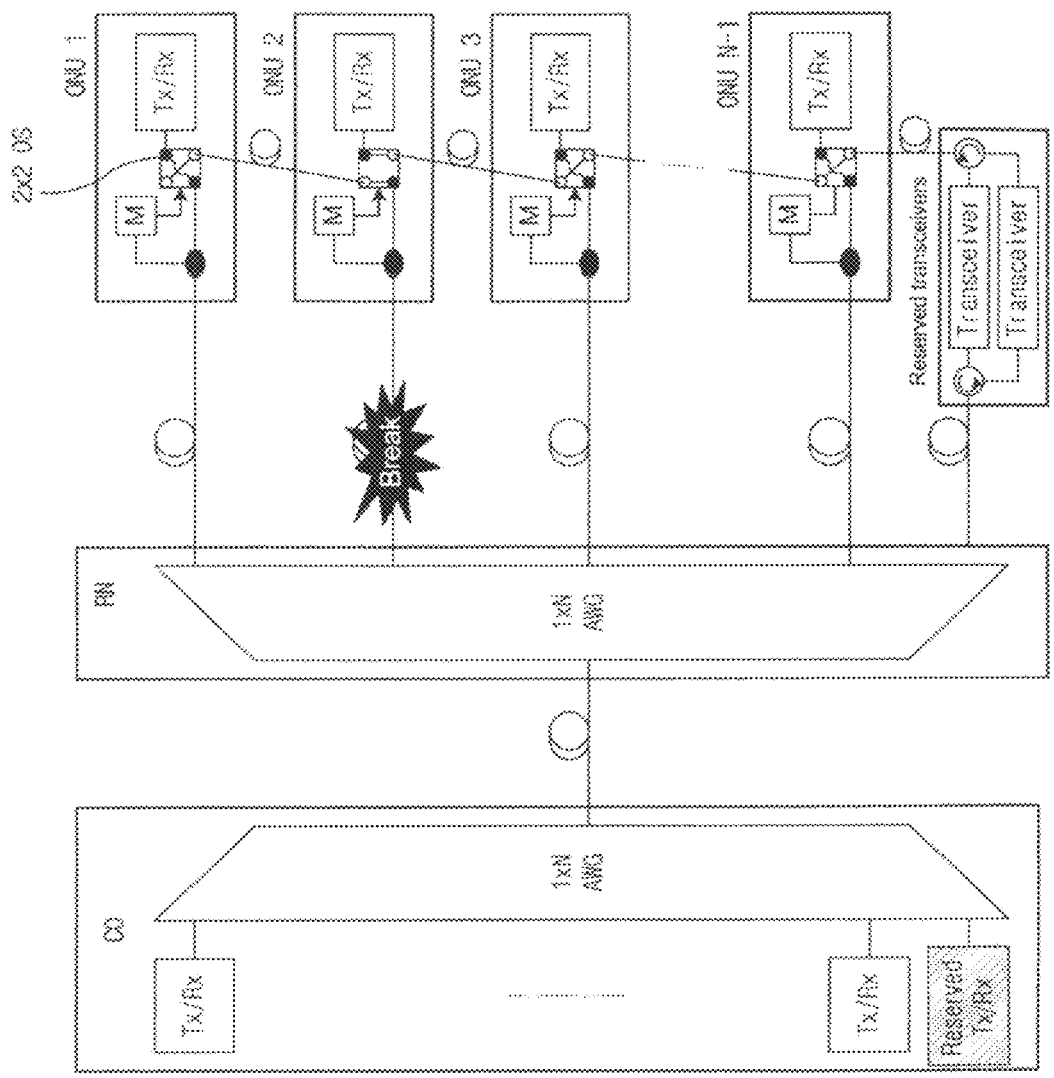
FIG. 4a is a view describing a communication recovering system in a WDM PON according to a sixth embodiment of the present invention.

FIG. 4a is a view describing a communication recovering system in a WDM PON according to a sixth embodiment of the present invention.

Referring to FIG. 4a, the central office CO of the communication recovering system in a WDM PON includes a 1×N AWG. The remote node RN includes a 1×N AWG which is connected to the AWG in the central office, in which demultiplexed signal input/output leads of the 1×N AWG in the remote node are transmitter and receiver of the ONUs, respectively. Especially, the n-th demultiplexed signal input/output leads of the 1×N AWG in the remote node are connected to the transceiver. Here, a reserved transmitter and receiver in the n-th demultiplexed signal input/output leads are further installed in the 1×N AWG in the central, in which each of the transmitter and receiver in each ONU is optically connected to the transceiver. The transmitter and receiver of each ONU are connected to the transceiver through a 2×2 optical switch, whose configuration is as below. Namely, regarding one 2×2 optical switch (hereinafter, the n-x-th 2×2 optical switch), the first input/output lead of the n-x-th 2×2 optical switch is connected to an AWG of the remote node, the second input/output lead of the n-x-th 2×2 optical switch, which is optically connected to the first input/output lead, is connected to the n-x-th transmitter and receiver, and the third and fourth input/output leads of the n-x-th 2×2 optical switch, which are optically connected to each other, are connected to the fourth and third input/output leads of the n-x−1-th and the n-x+1-th 2×2 optical switches, respectively. Here, the fourth input/output lead of the n−1-th 2×2 optical switch, which is connected to the n−1 demultiplexed signal input/output lead of the AWG of the remote node, is connected to a transceiver. Here, the transceiver includes a first transceiver which inputs signals outputted from the AWG of the remote node and outputs the signals to the ONU, and a second transceiver which inputs the signals outputted from the ONU and outputs the signals to the AWG of the remote node. The input lead of the first transceiver, the output lead of the second transceiver, the output lead of the first transceiver, and the input lead of the second transceiver are connected to the optical circulators, respectively. When the optical signals are inputted from the AWG of the remote node to the first transceiver, the first transceiver amplifies the inputted optical signals and outputs the amplified optical signals. The optical signals are inputted from the ONU to the second transceiver, the second transceiver amplifies the optical signals, transforms wavelength thereof, and then outputs the optical signals to the AWG of the remote node. Optical fiber fault monitors M's are installed in the AWG of the remote node and the 2×2 optical switches, respectively, in which the optical fiber fault monitors M's monitor optical fibers connecting the first input/output leads, respectively. The optical fiber fault monitors M's are connected to the 2×2 optical switches on a one-to-one basis.

Therefore, when a fault occurs in one of the optical fibers connecting the remote nodes to the ONUs, the optical fiber fault monitor detects such fault and switches the 2×2 optical switch connected to the optical fiber having such a fault such that the transmitter and the receiver connected to the optical fiber having the fault can be connected to the transceiver. For example, when a fault occurs in an optical fiber connecting the AWG of the remote node to the m-th 2×2 optical switch, the first input/output lead connected to the AWG of the remote node is connected to the fourth input/output lead of the m−1 2×2 optical switch connected to the third input/output lead, and the m-th transmitter and receiver connected to the second input/output lead is connected to the third input/output lead of the m+1-th 2×2 optical switch connected to the fourth input/output lead, thereby being connected to the transceiver. Therefore, when there is an fault in any one of the optical fibers, the AWG of the remote node and the optical fibers connecting the first transceiver to the second transceiver are connected to the transmitter and receiver of the ONU, which are connected to the optical fiber having such a fault, through the are connected to at least one of the 2×2 optical switches. Here, since the first and second transceivers are connected to the transmitter and the receiver of the ONU through at least one of the optical switches, the first and second transceivers amplify the inputted optical signals and output them thereto. Since the optical signals outputted from the transmitter of the ONU connected to the optical fiber having a fault are inputted to the reserved receiver of the central office, the second transceiver can transform wavelength of the optical signals.

Therefore, the embodiment of the present invention can rapidly recover fault in the optical fiber between the ONU and the remote node. Here, protection time is determined by summation of processing time of the optical fiber monitor, switching time of the 2×2 optical switch, and optical fiber passing time between ONUs.

The above-mentioned embodiment of the present invention may be associated with the third to fifth embodiment of the present invention, and a transceiver within a specific area and optical transmitter and receiver within an ONU having a fault can be communicated with relatively little optical power.

Embodiment 7

Figure 4B:
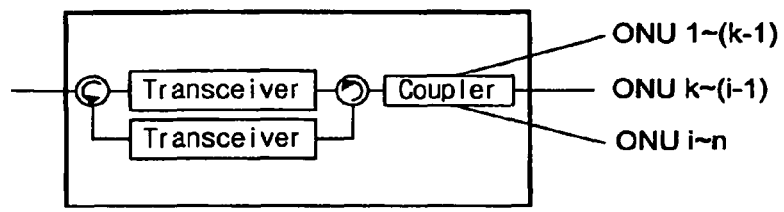
FIG. 4b is a view illustrating a modification of the communication recovering system in a WDM PON according to the sixth embodiment of the present invention.

FIG. 4b is a view illustrating a modification of the communication recovering system in a WDM PON according to the sixth embodiment of the present invention.

The embodiment illustrated in FIG. 4b is the same as that of FIG. 4a, except that the first and second transceivers are connected to the optical circulator connected to a star coupler, in which the star coupler is connected to each of the ONUs. Since the communication recovering system for a wavelength division multiplexed passive optical network according to the sixth embodiment of the present invention has sufficient optical margin of optical link, when the star coupler is connected thereto and at the same time a plurality of ONUs are serially or parallelly connected thereto, optical fibers between each of the ONUs and the remote node can be protected. Therefore, the embodiment of the present invention can protect optical fibers in a one to N manner regarding a WDM PON in which each remote node shares N ONUs, and also in a one to nN manner regarding a WDM PON in which a plurality of remote nodes shares nN ONUs, in which n remote nodes are shared.

As apparent from the above description, the communication recovering system for a WDM PON according to the present invention has advantages in that, cyclic transmission characteristics of the cyclic AWG are used, network efficiency is high by grouping two remote nodes in the WDM PON, recover is relatively rapidly achieved, and network maintenance costs are reduced as an outdoor network is configured by passive elements.

Also, the communication recovering system for a WDM PON according to the present invention has advantages in that, optical loss can be minimized in the WDM PON employing a light source without wavelength selectivity when an AWG of 2×N structure is used and in the WDM PON employing a light source whose wavelength is constant when electrical switching array is used, the system is cost-effective since the number of elements for implement can be reduced, and recover can be relatively rapidly achieved.

In addition, the communication recovering system for a WDM PON according to the present invention has advantages in that, since preserved transmitter and receiver, and transceiver are additionally used, network efficiency is increased, fault in the optical fibers between the remote node and the ONUs can be cost-effectively and rapidly recovered while optical margin is sufficiently secured.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A communication recovering system for a wavelength division multiplexed passive optical network (WDM PON) comprising:

a central office including: cyclic arrayed waveguide gratings (AWGs) C1 and C2; a first 1×2 optical switch installed at a multiplexed signal input/output lead of the cyclic AWG C1; a second 1×2 optical switch installed at a multiplexed signal input/output lead of the cyclic AWG C2; a first blue/red band coupler connected to each of the first and second 1×2 optical switches; a second blue/red band coupler connected to each of the first and second 1×2 optical switches; a first optical fiber fault monitor which is installed at an optical fiber connecting the first 1×2 optical switch to the first blue/red band coupler, and is connected to the first 1×2 optical switch; and a second optical fiber fault monitor which is installed at an optical fiber connecting the second 1×2 optical switch to the second blue/red band coupler, and is connected to the second 1×2 optical switch;

remote nodes including: a first remote node and a second remote node, wherein the first remote node includes a blue/red band coupler R11 connected to the first blue/red band coupler; a blue/red band coupler R12 connected to a red lead of the blue/red band coupler R11; a first 1×2 star coupler connected to a blue lead of each of the blue/red band couplers R11 and R12, and a cyclic AWG R1 whose multiplexed signal input/output lead is connected to the first 1×2 star coupler, and the second remote node includes a blue/red band coupler R21 connected to the second blue/red band coupler, a blue/red band coupler R22 connected to a blue lead of blue/red band coupler R21; a second 1×2 star coupler connected to a red lead of each of the blue/red band couplers R21 and R22; and a cyclic AWG R2 whose multiplexed signal input/output lead is connected to the second 1×2 star coupler, wherein the blue/red band coupler R12 and the blue/red band coupler R22 are connected to each other by an optical fiber, wherein when there is a fault in an optical fiber connecting the first blue/red band coupler to the blue/red band coupler R11, optical signals are inputted/outputted thereto/therefrom through the first 1×2 optical switch and the second blue/red band coupler, and when there is a fault in an optical fiber connecting the second blue/red band coupler to the blue/red band coupler R21, optical signals are inputted/outputted thereto/therefrom through the second 1×2 optical switch and the blue/red band coupler.

* * * * *